(12) United States Patent
Wang

(10) Patent No.: US 9,419,706 B2
(45) Date of Patent: Aug. 16, 2016

(54) SINGLE FIBER BI-DIRECTIONAL OPTICAL MODULE, AND TRANSPORT SYSTEM AND METHOD BASED THEREON

(71) Applicant: HUAWEI TECHNOLOGIES CO., LTD., Shenzhen, Guangdong (CN)

(72) Inventor: Songping Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/071,918

(22) Filed: Nov. 5, 2013

(65) Prior Publication Data
US 2014/0064721 A1    Mar. 6, 2014

Related U.S. Application Data

(63) Continuation of application No. PCT/CN2011/073695, filed on May 5, 2011.

(51) Int. Cl.
*H04B 10/038* (2013.01)
*H04B 10/25* (2013.01)
*H04B 10/40* (2013.01)

(52) U.S. Cl.
CPC .......... *H04B 10/038* (2013.01); *H04B 10/2503* (2013.01); *H04B 10/40* (2013.01)

(58) Field of Classification Search
None
See application file for complete search history.

(56) References Cited

U.S. PATENT DOCUMENTS

| 6,728,486 | B1 | 4/2004 | Hutchison et al. |
| 2004/0175187 | A1 | 9/2004 | Eiselt et al. |
| 2005/0019036 | A1 | 1/2005 | Soto et al. |

FOREIGN PATENT DOCUMENTS

| CN | 1307409 | 8/2001 |
| CN | 1307410 | 8/2001 |
| CN | 2540711 | 3/2003 |
| CN | 2550785 | 5/2003 |
| CN | 2611922 | 4/2004 |
| CN | 1674472 | 9/2005 |
| CN | 101166069 | 4/2008 |

(Continued)

OTHER PUBLICATIONS

International Search Report and Written Opinion on Searching Authority issued Mar. 1, 2012 in corresponding International Application No. PCT/CN2011/073695.

(Continued)

*Primary Examiner* — Darren E Wolf
(74) *Attorney, Agent, or Firm* — Staas & Halsey LLP

(57) ABSTRACT

Embodiments of the present invention include a single fiber bi-directional optical module, and a transport system and method based thereon. The single fiber bi-directional optical module includes a self-search circuit respectively connected to a transmission selection circuit and a receiving selection circuit. The self-search circuit is configured to search for channels, and instruct, the transmission selection circuit to transmit optical signals through one of at least two transmitting channels, where optical wavelengths of the at least two channels are different; and instruct the receiving selection circuit to receive optical signals through one of at least two receiving channels, where optical wavelengths of the at least two receiving channels correspond to the optical wavelengths of the at least two transmitting channels. The single fiber bi-directional optical module does not need to be used in pairs, so that device numbers and maintenance costs are reduced.

11 Claims, 7 Drawing Sheets

(56) References Cited

FOREIGN PATENT DOCUMENTS

| | | |
|---|---|---|
| CN | 101729949 | 6/2010 |
| JP | 63-227225 | 9/1988 |
| JP | 2007-28539 | 2/2007 |
| JP | 2007-104625 | 4/2007 |
| WO | WO 2004/056020 | 7/2004 |
| WO | WO 2004/112264 | 12/2004 |
| WO | WO 2007/109277 | 9/2007 |

OTHER PUBLICATIONS

Extended European Search Report issued in Jul. 17, 2014 in corresponding European Patent Application No. 11 76 2034.4.

Japanese Notice of Allowance dated Jul. 28, 2015 in corresponding Japanese Patent Application No. 2014-508668.

SINGLE FIBER BI-DIRECTIONAL OPTICAL MODULE, AND TRANSPORT SYSTEM AND METHOD BASED THEREON

CROSS-REFERENCE TO RELATED APPLICATIONS

This application is a continuation of International Application No. PCT/CN2011/073695, filed on May 5, 2011, which is hereby incorporated by reference in its entirety.

TECHNICAL FIELD

Embodiments of the present invention relate to the field of communication technologies, and in particular, to a single fiber bi-directional optical module, and a transport system and method based thereon.

BACKGROUND

With the development of optical communication technologies, optical modules are applied more and more extensively. Common optical modules include: small form factor (Small Form Factor, SFF for short), small form-factor pluggable (Small Form-factor Pluggable, SFP for short), enhanced small form-factor pluggable (Enhanced Small Form-factor Pluggable, ESFP for short), and single fiber bi-directional optical modules.

Functionally, the SFF is similar to the SFP. FIG. 1a is a schematic diagram showing an application manner of existing SFP, ESFP, and SFF optical modules in a transport system. As shown in FIG. 1a, a transmission fiber is separated from a receiving fiber, and Lucent connector (Lucent connector, LC) fibers are used. The difference lies in that: the SFF is fixed, and is used after its pins are fixed, and does not support hot-plugging, while the SFP supports hot-plugging. Basic functions of the ESFP are similar to those of the SFP. However, compared with the SFP, the ESFP has monitoring functions for performance such as the current and voltage of the optical module.

Because the transmission fiber and the receiving fiber are separated, the foregoing several optical modules all waste fiber resources; furthermore, because the transmission fiber and the receiving fiber are separated, asymmetric compensation of fibers is required in a time synchronization application.

Compared with the SFP, ESFP, and SFF optical modules, the single fiber bi-directional (Single Fiber Bi-directional SFP) optical module occupies far fewer fiber resources. The single fiber bi-directional optical module uses an LC fiber for both transmitting and receiving, supports hot-plugging, and supports monitoring functions for performance such as the current and voltage of the optical module. FIG. 1b is a schematic diagram showing an application manner of existing single fiber bi-directional optical modules in a transport system. As shown in FIG. 1b, a single fiber bi-directional optical module may use different wavelengths in a same fiber to establish two channels that do not interfere with each other: channel_1 and channel_2.

However, in the single fiber bi-directional optical modules, the optical modules at a transmitting end and a receiving end must be used in pairs. For example, the wavelength of a transmitting channel of a local optical module A is 1310 nm, and the wavelength of a receiving channel thereof is 1490 nm; if a peer optical module B is used in pairs with the local optical module A, in the peer optical module B, the wavelength of a transmitting channel needs to be 1490 nm, and the wavelength of a receiving channel needs to be 1310 nm.

Therefore, the existing single fiber bi-directional optical modules may have some problems. For example, because two optical modules communicating with each other are generally not in the same place, it is necessary to pair the optical modules during port fiber installation, and confirm whether pairing and interconnection are successful. When the more the optical module pairs are, the more complex the installation is, and the more easily errors occur. Hence, reliability of installation is reduced, and installation and maintenance costs are increased.

SUMMARY

Embodiments of the present invention provide a single fiber bi-directional optical module, and a transport system and method based thereon to resolve defects of complex installation and many numbers in installing single fiber bi-directional optical modules in the prior art, thereby implementing easy installation, and reducing device numbers and maintenance costs.

An embodiment of the present invention provides a single fiber bi-directional optical module, including a self-search circuit respectively connected to a transmission selection circuit and a receiving selection circuit, where:

the self-search circuit is configured to search for channels, and instruct, according to a channel search result, the transmission selection circuit to transmit optical signals through one of at least two channels for transmitting optical signals, where optical wavelengths of the at least two channels for transmitting optical signals are different; and the self-search circuit is further configured to instruct, according to a channel search result, the receiving selection circuit to receive optical signals through one of at least two channels for receiving optical signals; wherein optical wavelengths of the at least two channels for receiving optical signals correspond to the optical wavelengths of the at least two channels for transmitting optical signals.

An embodiment of the present invention further provides a transport system based on a single fiber bi-directional optical module, including a first single fiber bi-directional optical module and a second single fiber bi-directional optical module, where:

the first single fiber bi-directional optical module is any one of the single fiber bi-directional optical modules provided by the embodiments of the present invention, and the second single fiber bi-directional optical module is any one of the single fiber bi-directional optical modules provided by the embodiments of the present invention; and optical signals are transported between the first single fiber bi-directional optical module and the second single fiber bi-directional optical module through a communication fiber, wherein a transmission selection circuit of the first single fiber bi-directional optical module is configured to transmit optical signals to a receiving selection circuit of the second single fiber bi-directional optical module; and a receiving selection circuit of the first single fiber bi-directional optical module is configured to receive optical signals transmitted by a transmission selection circuit of the second single fiber bi-directional optical module.

An embodiment of the present invention provides an optical signal transport method based on a single fiber bi-directional optical module, including:

searching, by a self-search circuit of the single fiber bi-directional optical module, for channels; and according to a channel search result, transmitting, by the single fiber bi-directional optical module, optical signals through one of at least two channels for transmitting optical signals, and receiving optical signals through one of at least two channels for receiving optical signals;

wherein optical wavelengths of the at least two channels for transmitting optical signals are different, and optical wavelengths of the at least two channels for receiving optical signals correspond to the optical wavelengths of the at least two channels for transmitting optical signals.

In the single fiber bi-directional optical module, and the transport system and method based thereon in the embodiments of the present invention, the self-search circuit of the single fiber bi-directional optical module may control selection of optical communication channels between the local single fiber bi-directional optical module and a peer single fiber bi-directional optical module. Therefore, single fiber bi-directional optical modules at a local end and a peer end of an optical line may have the same structure, and single fiber bi-directional optical modules do not need to be used in pairs; hence device numbers and maintenance costs are reduced.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1A:
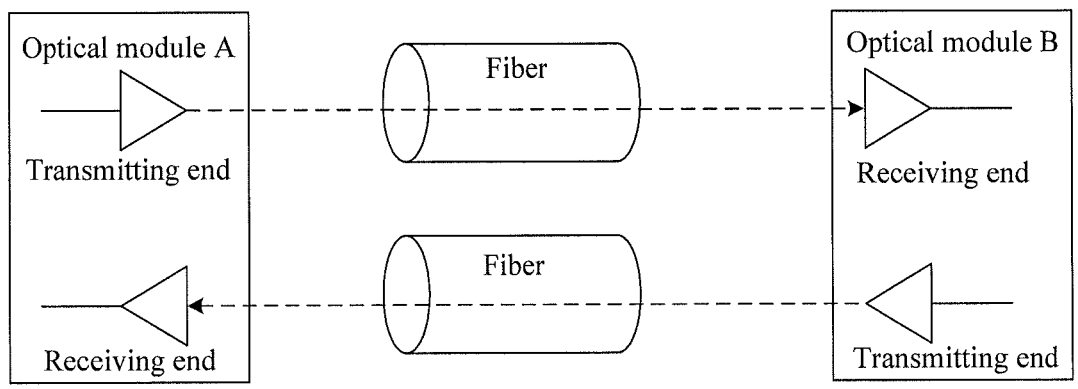
FIG. 1a is a schematic diagram showing an application manner of existing SFP, SSFP, and SFF optical modules in a transport system.
Figure 1B:
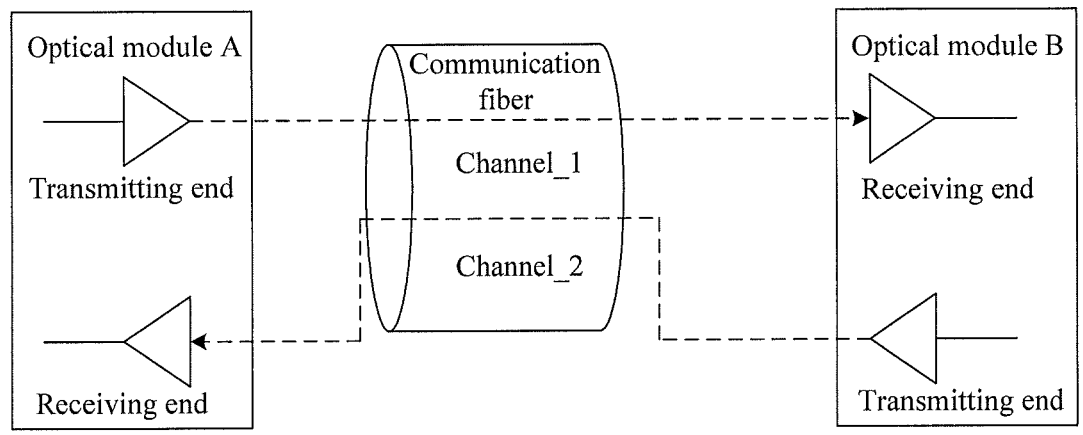
FIG. 1b is a schematic diagram showing an application manner of existing single fiber bi-directional optical modules in a transport system.
Figure 2:
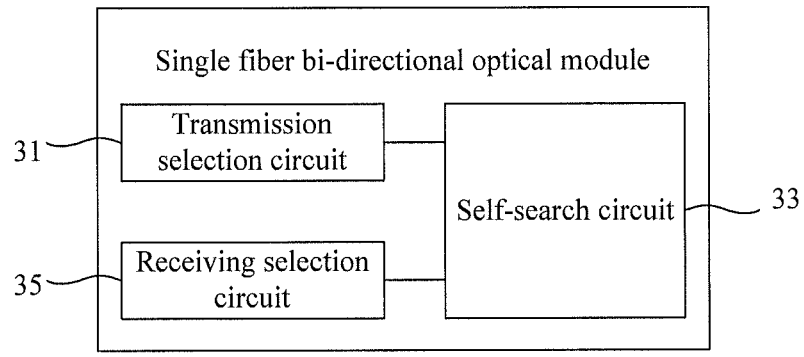
FIG. 2 is a schematic structural diagram of a single fiber bi-directional optical module according to an embodiment of the present invention.

FIG. 2 is a schematic structural diagram of a single fiber bi-directional optical module according to an embodiment of the present invention. As shown in FIG. 2, the single fiber bi-directional optical module includes a self-search circuit 33 respectively connected to a transmission selection circuit 31 and a receiving selection circuit 35.

The self-search circuit 33 is configured to search for channels, and instruct, according to a channel search result, the transmission selection circuit 31 to transmit optical signals through one of at least two channels for transmitting optical signals, where optical wavelengths of the at least two channels for transmitting optical signals are different.

The self-search circuit 33 is further configured to instruct, according to a channel search result, the receiving selection circuit 35 to receive optical signals through one of at least two channels for receiving optical signals.

Optical wavelengths of the at least two channels for receiving optical signals correspond to the optical wavelengths of the at least two channels for transmitting optical signals.

In this embodiment, the self-search circuit of the single fiber bi-directional optical module may control selection of optical communication channels between the local single fiber bi-directional optical module and a peer single fiber bi-directional optical module. Therefore, single fiber bi-directional optical modules at a local end and a peer end of an optical line may have the same structure, and only one fiber needs to be connected to a port of each single fiber bi-directional optical module on site; hence reliability of installation is improved, and installation and maintenance costs are reduced.

Figure 3:
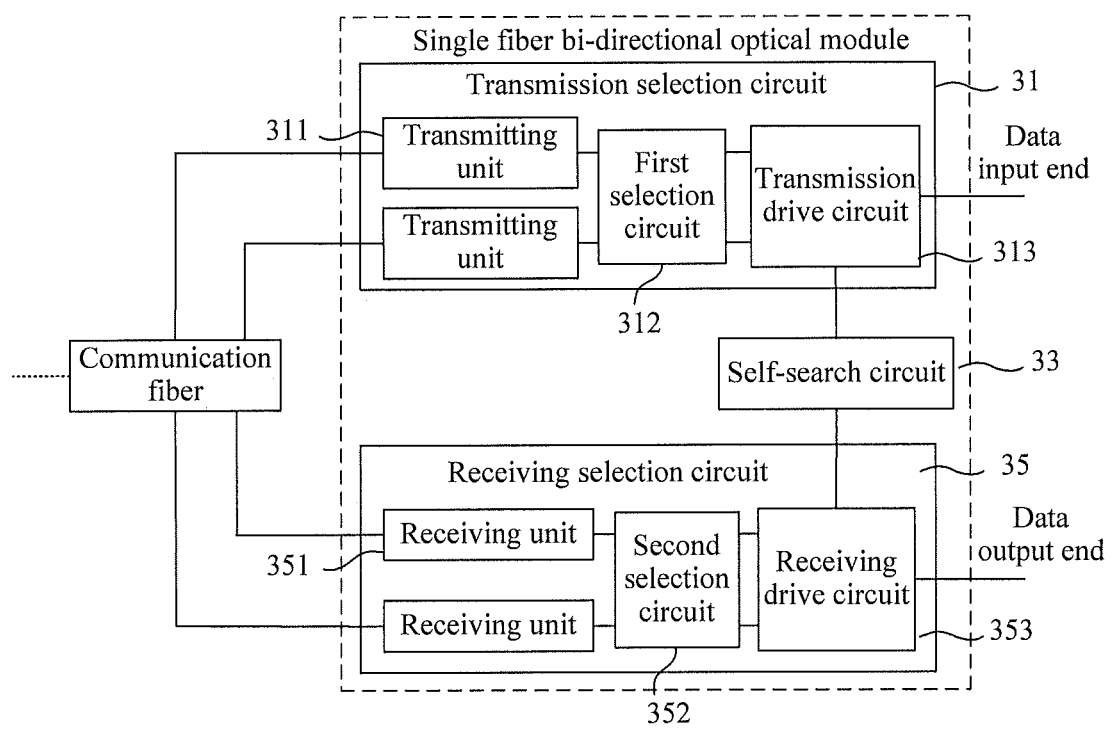
FIG. 3 is a schematic structural diagram of a single fiber bi-directional optical module according to another embodiment of the present invention.

Optionally, as shown in FIG. 3, which is a schematic structural diagram of a single fiber bi-directional optical module according to another embodiment of the present invention, the transmission selection circuit 31 may include a transmission drive circuit 313 and at least two transmitting units 311 (for ease of description, FIG. 3 and subsequent relevant drawings only illustrate the case of two transmitting units), where wavelengths of optical signals transmitted by the at least two transmitting units 311 are different. The transmission drive circuit 313 is configured to select and drive, according to an instruction of the self-search circuit 33, one of the at least two transmitting units to transmit optical signals through one of the at least two channels for transmitting optical signals.

Optionally, the transmission drive circuit 313 may be connected to the at least two transmitting units 311 through a first selection circuit 312. The transmission drive circuit 313 is configured to select and drive, according to the instruction of the self-search circuit 33 through the first selection circuit 312, one of the at least two transmitting units 311 to transmit optical signals through one of the at least two channels for transmitting optical signals. The at least two transmitting units 311 are connected externally to a communication fiber, and driven by the transmission drive circuit 313 to transmit optical signals through the communication fiber.

Optionally, as shown in FIG. 3, the receiving selection circuit 35 may include: a receiving drive circuit 353 and at least two receiving units 351 (for ease of description, FIG. 3 and subsequent relevant drawings only illustrate the case of two receiving units). Wavelengths of optical signals received by the at least two receiving units are different. The receiving drive circuit 353 is configured to select and drive, according to the instruction of the self-search circuit 33, one of the at least two receiving units 351 to receive optical signals through one of the at least two channels for receiving optical signals.

Optionally, the receiving drive circuit 353 may be connected to the at least two receiving units 351 through a second selection circuit 352. The receiving drive circuit 353 is configured to select and drive, according to the instruction of the self-search circuit 33 through the second selection circuit 352, one of the at least two receiving units 351 to receive optical signals through one of the at least two channels for receiving optical signals. The at least two receiving units 351 are connected externally to a communication fiber, and driven by the receiving drive circuit 353 to receive optical signals through the communication fiber.

Wavelengths of the at least two transmitting units 311 are respectively equal to wavelengths of the at least two receiving units 351 correspondingly.

The self-search circuit 33 is respectively connected to the transmission selection circuit 31 and the receiving selection circuit 35, and configured to instruct, according to a channel search result, the transmission selection circuit 31 to transmit optical signals, and instruct the receiving selection circuit 35 to receive optical signals, so as to control the single fiber bi-directional optical module to establish optical communication channels of different wavelengths with a peer single fiber bi-directional optical module.

In this embodiment, the single fiber bi-directional optical module has a channel self-search function, and may control selection of optical communication channels between a local single fiber bi-directional optical module and a peer single fiber bi-directional optical module through the self-search circuit. Therefore, single fiber bi-directional optical modules do not need to be used in pairs, reliability of installation is improved, and installation and maintenance costs are reduced.

Figure 4:
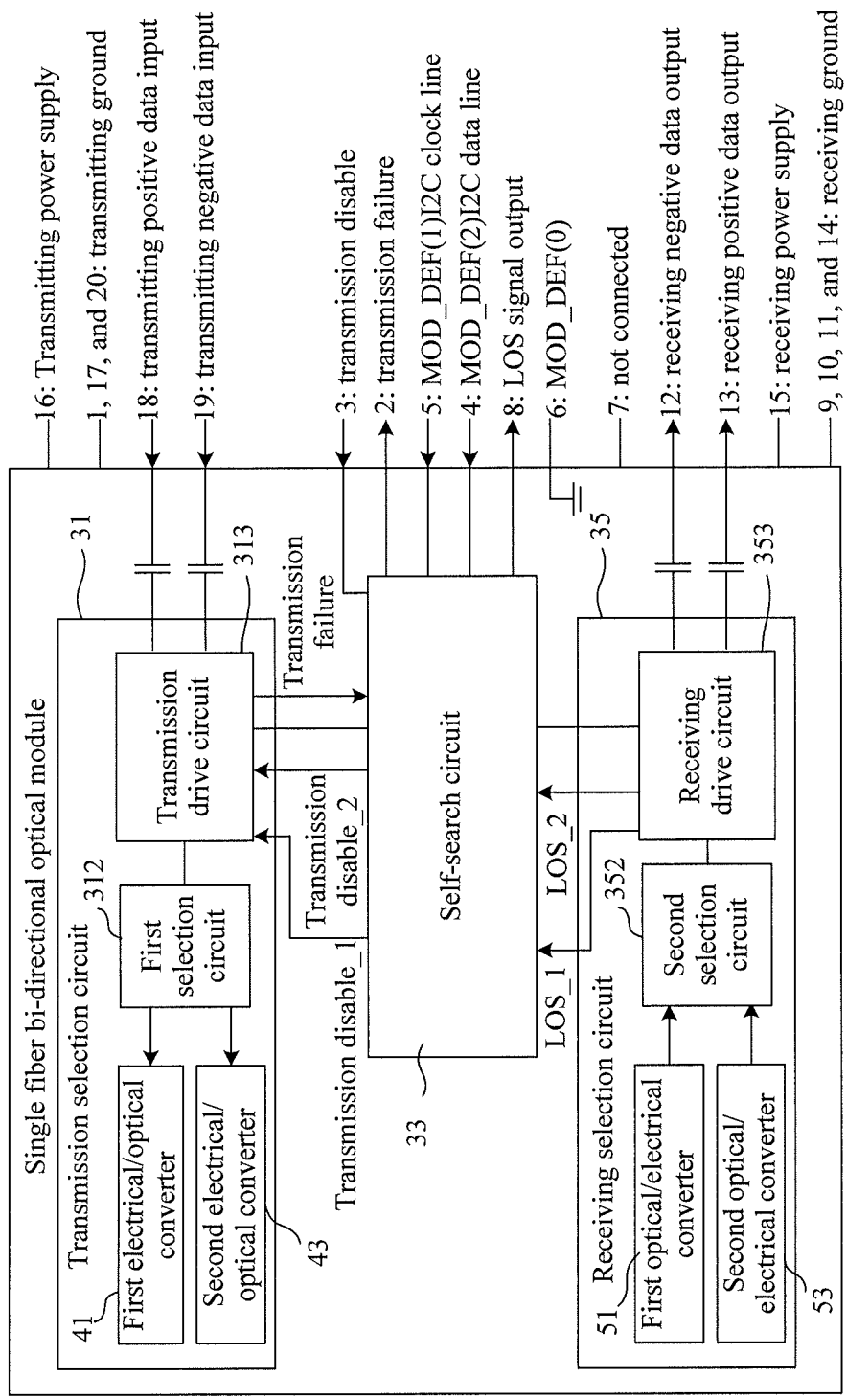
FIG. 4 is a schematic structural diagram of a single fiber bi-directional optical module according to another embodiment of the present invention.

FIG. 4 is a schematic structural diagram of a single fiber bi-directional optical module according to another embodiment of the present invention. As shown in FIG. 4, the single fiber bi-directional optical module may use standard pins, where the specific meaning of each pin is as follows:

Pin 16 is a transmitting power supply; pins 1, 17, and 20 are transmitting grounds; pin 18 is a transmitting positive data input; pin 19 is a transmitting negative data input; pin 3 is transmission disable; pin 2 is transmission failure; pin 5 is a MOD_DEF(1)I2C clock line; pin 4 is a MOD_DEF(2)I2C data line; pin 8 is an LOS signal output; pin 6 is MOD_DEF(0); pin 7 is not connected; pin 12 is a receiving negative data output; pin 13 is a receiving positive data output; pin 15 is a receiving power supply; and pins 9, 10, 11, and 14 are receiving grounds.

In the single fiber bi-directional optical module shown in FIG. 4, input ends of the transmission drive circuit 313 are correspondingly connected to the transmitting positive data input pin 18 and the transmitting negative data input pin 19, and an output end of the transmission drive circuit 313 is connected to the at least two transmitting units through the first selection circuit 312. In this example, the transmitting units are electrical/optical converters.

Input ends of a first electrical/optical converter 41 and a second electrical/optical converter 43 are respectively connected to the first selection circuit 312, and output ends of the first electrical/optical converter 41 and the second electrical/optical converter 43 are respectively connected to a communication fiber. The first electrical/optical converter 41 and second electrical/optical converter 43 use different wavelengths. The wavelength selection range is not limited by the embodiment of the present invention, so long as signals of two wavelengths do not interfere with each other. For example, the wavelength of the first electrical/optical converter is 1310 nm, and the wavelength of the second electrical/optical converter 43 is 1490 nm.

The transmission drive circuit 313 is configured to select and drive, according to a selection instruction of the self-search circuit through the first selection circuit 312, the electrical/optical converter 41 or the second electrical/optical converter 43 to perform electrical/optical conversion for signals of a host and transmit optical signals through the communication fiber. Definitely, optionally, if a transmission disable signal is valid, the first electrical/optical converter 41 and the second electrical/optical converter 43 are turned off. In this example, the transmission drive circuit 313 may be a set of automatic temperature control (Automatic Temperature Control, ATC), automatic power control (Automatic Power Control, APC), and drive, and may further include a 2-to-1 selection circuit, namely, the first selection circuit 312. Definitely, the first selection circuit 312 and the transmission drive circuit 313 may also be disposed separately. In normal operation, the transmission drive circuit 313 selects and drives one of the first electrical/optical converter 41 and the second electrical/optical converter 43 to be in a transmitting state, and the other one to be in a turn-off state. When an external transmission disable signal is valid, the two electrical/optical converters may be both turned off.

In the single fiber bi-directional optical module shown in FIG. 4, the two output ends of the receiving drive circuit 353 are correspondingly connected to the receiving negative data output pin 12 and the receiving positive data output pin 13, and the input end of the receiving drive circuit 353 is connected to the at least two receiving units through the second selection circuit 352. In this example, the receiving units are optical/electrical converters.

Input ends of a first optical/electrical converter 51 and a second optical/electrical converter 53 are respectively connected to a communication fiber. The first optical/electrical converter 51 and the second optical/electrical converter 53 may receive optical signals and perform optical/electrical conversion. The first optical/electrical converter 51 and the second optical/electrical converter 53 use different wavelengths. The wavelength of the first optical/electrical converter 51 corresponds to the wavelength of the first electrical/optical converter 41, and the wavelength of the second optical/electrical converter 53 corresponds to the wavelength of the second electrical/optical converter 43. For example, the wavelength of the first optical/electrical converter 51 is 1310 nm, and the wavelength of the second optical/electrical converter 53 is 1490 nm.

The receiving drive circuit 353 is configured to select and drive, according to the selection instruction of the self-search circuit through the second selection circuit 352, the first optical/electrical converter 51 or the second optical/electrical converter 53 to perform optical/electrical conversion for optical signals received through the communication fiber. In this example, the receiving drive circuit 353 may amplify the signals converted by the optical/electrical converter, and may further include a 2-to-1 selection circuit, namely, the second selection circuit 352. Definitely, the second selection circuit 352 and the receiving drive circuit 353 may also be disposed separately. In normal operation, the receiving drive circuit 353 selects signals of the first optical/electrical converter 51 or the second optical/electrical converter 53 to perform amplification.

Optionally, the self-search circuit 33 may be further configured to detect whether any exception occurs when the receiving selection circuit 35 receives optical signals; furthermore, if an exception occurs when the receiving selection circuit 35 receives optical signals, the self-search circuit 33 is configured to instruct the transmission selection circuit 31 and the receiving selection circuit 35 to switch a current channel for receiving optical signals and a current channel for transmitting optical signals. For example, if it is detected that loss or degradation occurs during reception of optical signals, the self-search circuit 33 instructs the transmission selection circuit 31 and the receiving selection circuit 35 to make reselection to switch the current channel for receiving and the current channel for transmitting.

Figure 5:
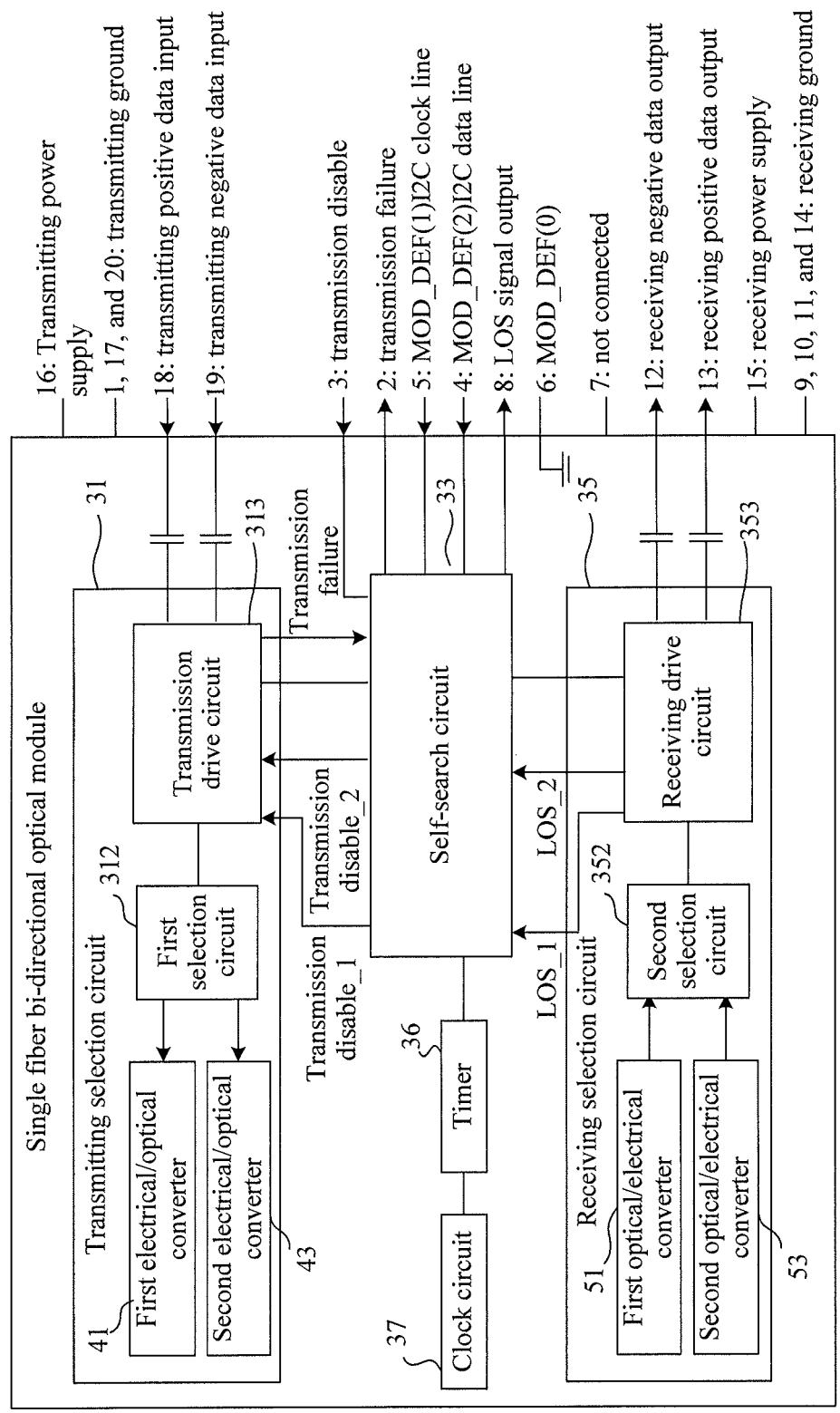
FIG. 5 is a schematic structural diagram of a single fiber bi-directional optical module according to another embodiment of the present invention.

In addition, further, as shown in FIG. 5, which is a schematic structural diagram of a single fiber bi-directional optical module according to another embodiment of the present invention, the single fiber bi-directional optical module may further include:

a timer 36, configured to provide a timing signal for the self-search circuit 33 according to a reference clock signal; and a clock circuit 37, configured to provide the reference clock signal for the timer 36.

In this embodiment, the single fiber bi-directional optical module has a channel self-search function, and may control selection of optical communication channels between the local single fiber bi-directional optical module and a peer single fiber bi-directional optical module through the self-search circuit. Therefore, the local and peer single fiber bi-directional optical modules may have the same structure, and only one fiber needs to be connected to a port of each single fiber bi-directional optical module on site. The installation is simple, and the modules do not need to be used in pairs; hence device numbers and maintenance costs are reduced.

Figure 6:
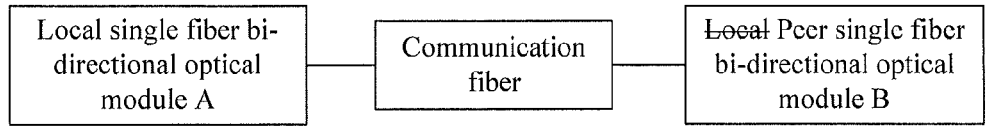
FIG. 6 is a schematic structural diagram of a transport system based on a single fiber bi-directional optical module according to an embodiment of the present invention.

FIG. 6 is a schematic structural diagram of a transport system based on a single fiber bi-directional optical module according to an embodiment of the present invention. As shown in FIG. 6, the transport system based on a single fiber bi-directional optical module may include a first single fiber bi-directional optical module A and a second single fiber bi-directional optical module B.

Optical signals are transported between the first single fiber bi-directional optical module A and the second single fiber bi-directional optical module B through a communication fiber.

The first single fiber bi-directional optical module A and the second single fiber bi-directional optical module B are single fiber bi-directional optical modules of any structure provided by the embodiment of the present invention.

Optical signals are transported between the first single fiber bi-directional optical module A and the second single fiber bi-directional optical module B through a communication fiber.

A transmission selection circuit of the first single fiber bi-directional optical module A is configured to transmit optical signals to a receiving selection circuit of the second single fiber bi-directional optical module B.

A receiving selection circuit of the first single fiber bi-directional optical module A is configured to receive optical signals transmitted by a transmission selection circuit of the second single fiber bi-directional optical module B.

Figure 7:
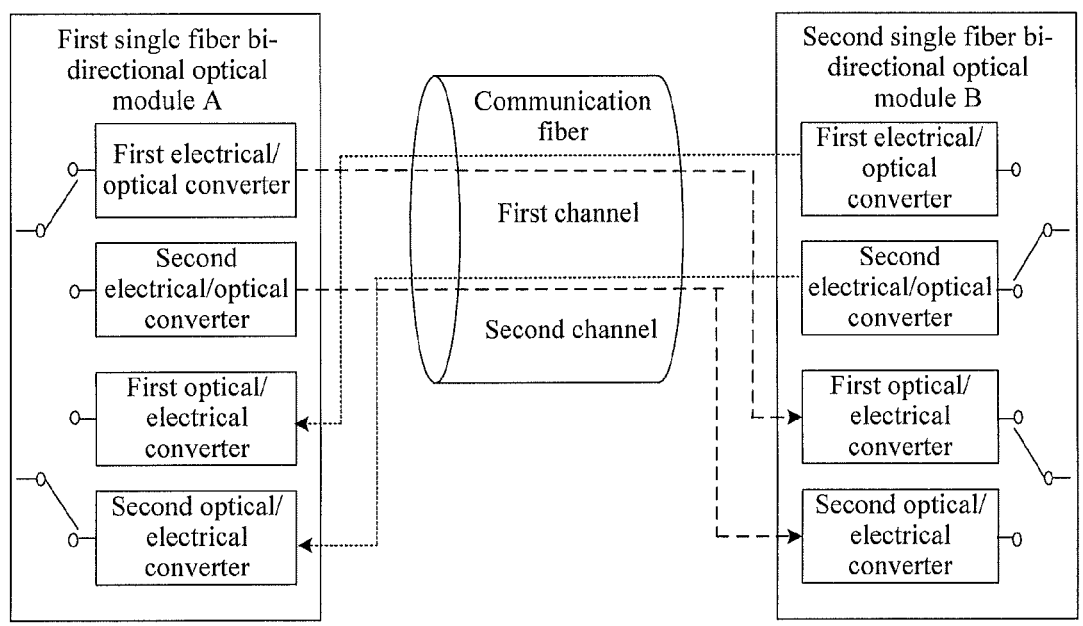
FIG. 7 is a schematic diagram showing a channel relationship of a transport system based on a single fiber bi-directional optical module according to another embodiment of the present invention.

FIG. 7 is another schematic diagram of a transport system based on a single fiber bi-directional optical module according to another embodiment of the present invention. As shown in FIG. 7, in the transport system based on a single fiber bi-directional optical module, at least two transmitting units in the first single fiber bi-directional optical module A are electrical/optical converters; and at least two receiving units therein are optical/electrical converters. At least two transmitting units in the second single fiber bi-directional optical module B are electrical/optical converters; and at least two receiving units therein are optical/electrical converters.

In the transport system based on a single fiber bi-directional optical module in this embodiment, a self-search circuit of the single fiber bi-directional optical module may control selection of optical communication channels between the first single fiber bi-directional optical module and the second single fiber bi-directional optical module. Therefore, structures of the first single fiber bi-directional optical module and the second single fiber bi-directional optical module may be the same, and the single fiber bi-directional optical modules do not need to be used in pairs; hence device numbers and maintenance costs are reduced, and reliability of on-site installation is improved. Furthermore, because at least two transmitting units and at least two receiving units are used, if one channel therein is unavailable due to a fault of a transmitting or receiving component, the channel self-search function may be restarted to implement switching, thereby implementing channel-level protection and improving reliability.

Figure 8:
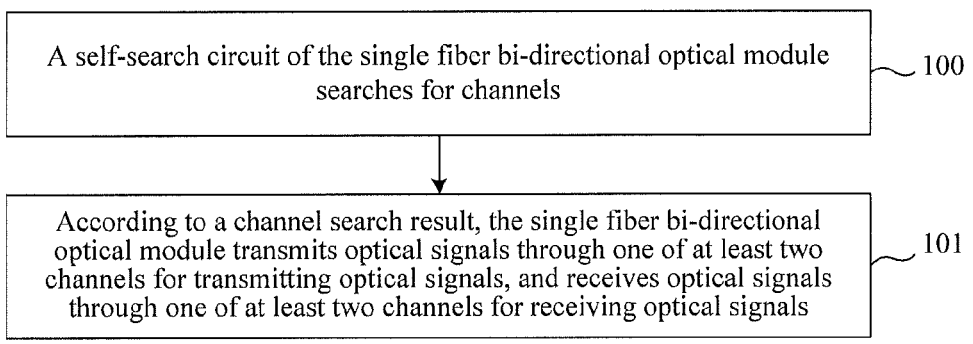
FIG. 8 is a flowchart of an optical signal transport method based on a single fiber bi-directional optical module according to an embodiment of the present invention.

FIG. 8 is a flowchart of an optical signal transport method based on a single fiber bi-directional optical module according to an embodiment of the present invention. As shown in FIG. 8, the method includes:

100. A self-search circuit of the single fiber bi-directional optical module searches for channels.

The searching, by a self-search circuit of the single fiber bi-directional optical module, for channels, may specifically include:

detecting whether any exception occurs during reception of optical signals; and if an exception occurs during the reception of optical signals, switching a current channel for receiving optical signals and a current channel for transmitting optical signals.

101. According to a channel search result, the single fiber bi-directional optical module transmits optical signals through one of at least two channels for transmitting optical signals, and receives optical signals through one of at least two channels for receiving optical signals.

Optical wavelengths of the at least two channels for transmitting optical signals are different, and optical wavelengths of the at least two channels for receiving optical signals correspond to the optical wavelengths of the at least two channels for transmitting optical signals.

In this embodiment, the single fiber bi-directional optical module has a channel self-search function, and may control selection of optical communication channels between the local single fiber bi-directional optical module and a peer single fiber bi-directional optical module through the self-search circuit. Therefore, the local and peer single fiber bi-directional optical modules may have the same structure, and only one fiber needs to be connected to a port of each single fiber bi-directional optical module on site. The installation is simple, and the modules do not need to be used in pairs; hence device numbers and maintenance costs are reduced.

Figure 9:
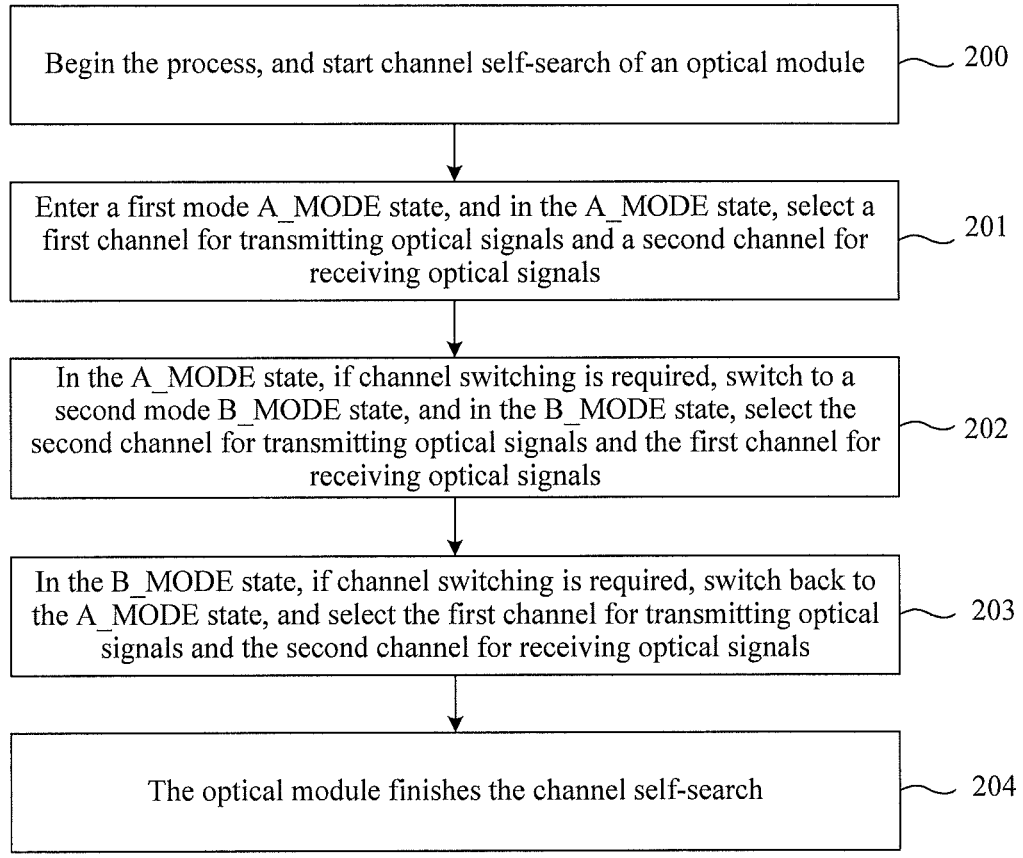
FIG. 9 is a flowchart of an optical signal transport method based on a single fiber bi-directional optical module according to another embodiment of the present invention.

Optionally, as shown in FIG. 9, which is a flowchart of an optical signal transport method based on a single fiber bi-directional optical module according to another embodiment of the present invention, the channel search process in the foregoing method may include:

200. Begin the process, and start channel self-search of an optical module.

201. Enter a first mode A_MODE state, and in the A_MODE state, select a first channel for transmitting optical signals and a second channel for receiving optical signals.

202. In the A_MODE state, if channel switching is required, switch to a second mode B_MODE state, and in the B_MODE state, select the second channel for transmitting optical signals and the first channel for receiving optical signals.

For example, when loss or degradation occurs during reception of optical signals, channel switching is required. In an actual application, channel switching may also be required due to other reasons, which are not described exhaustively herein.

203. In the B_MODE state, if channel switching is required, switch back to the A_MODE state, and select the first channel for transmitting optical signals and the second channel for receiving optical signals.

Optionally, in the B_MODE state, if channel switching is required, it is also allowed to switch to a third mode C_MODE state, and in the C_MODE state, select a third channel for transmitting optical signals and a fourth channel for receiving optical signals.

Steps 201 to 203 are repeated, until the reception of signals is normal.

204. The optical module finishes the channel self-search.

Figure 10:
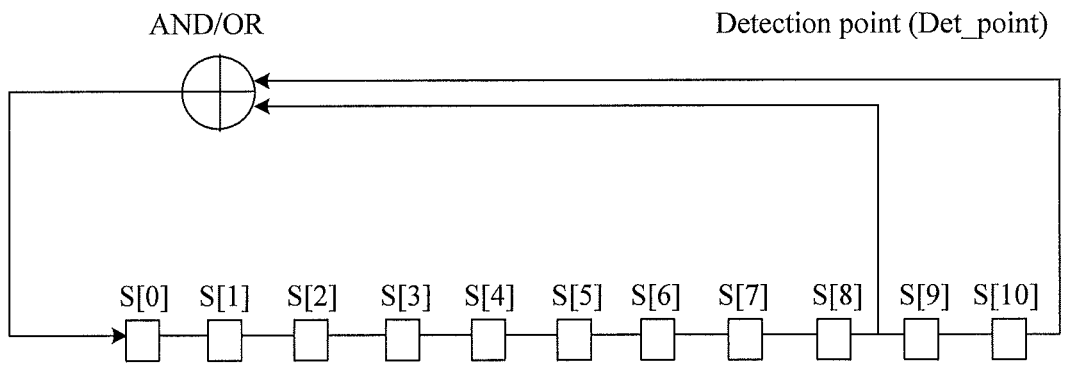
FIG. 10 is a schematic state diagram of a shift register in an optical signal transport method based on a single fiber bi-directional optical module according to another embodiment of the present invention.

Optionally, to ensure that the self-search circuits of the single fiber bi-directional optical modules at both ends select a channel correctly, an algorithm may be used to control channel switching of the single fiber bi-directional optical modules at both ends. For example, an 11-bit linear feedback shift register S[10:0] may be used to generate a pseudo random sequence. FIG. 10 is a schematic state diagram of a shift register in an optical signal transport method based on a single fiber bi-directional optical module according to another embodiment of the present invention, where S[10] of the shift register is a detection point, and an XNOR operation is performed on values of S[10] and S[8] to obtain S[0]. Table 1 is an example showing the specific content of the shift register S[10:0] in different clock periods.

TABLE 1

Content of the shift register S[10:0] in different clock periods

| Clock Period | S0 | S1 | S2 | S3 | S4 | S5 | S6 | S7 | S8 | S9 | S10 |
|---|---|---|---|---|---|---|---|---|---|---|---|
| 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 |
| 2 | 1 | 1 | 0 | 0 | 0 | 0 | 0 | 0 | 0 | 0 | 0 |
| 3 | 1 | 1 | 1 | 0 | 0 | 0 | 0 | 0 | 0 | 0 | 0 |
| 4 | 1 | 1 | 1 | 1 | 0 | 0 | 0 | 0 | 0 | 0 | 0 |
| 5 | 1 | 1 | 1 | 1 | 1 | 0 | 0 | 0 | 0 | 0 | 0 |
| 6 | 1 | 1 | 1 | 1 | 1 | 1 | 0 | 0 | 0 | 0 | 0 |
| 7 | 1 | 1 | 1 | 1 | 1 | 1 | 1 | 0 | 0 | 0 | 0 |
| 8 | 1 | 1 | 1 | 1 | 1 | 1 | 1 | 1 | 0 | 0 | 0 |
| 9 | 1 | 1 | 1 | 1 | 1 | 1 | 1 | 1 | 1 | 0 | 0 |
| 10 | 0 | 1 | 1 | 1 | 1 | 1 | 1 | 1 | 1 | 1 | 0 |
| 11 | 0 | 0 | 1 | 1 | 1 | 1 | 1 | 1 | 1 | 1 | 1 |
| 12 | 1 | 0 | 0 | 1 | 1 | 1 | 1 | 1 | 1 | 1 | 1 |
| 13 | 1 | 1 | 0 | 0 | 1 | 1 | 1 | 1 | 1 | 1 | 1 |
| 14 | 1 | 1 | 1 | 0 | 0 | 1 | 1 | 1 | 1 | 1 | 1 |
| 15 | 1 | 1 | 1 | 1 | 0 | 0 | 1 | 1 | 1 | 1 | 1 |

Referring to Table 1, the first single fiber bi-directional optical module A and the second single fiber bi-directional optical module B may use the shift register to decide whether channel switching is required. For example, if the self-search circuit detects that no signal is lost, the currently selected transmitting and receiving channels are maintained. If signals are lost, whether channel switching is required may be decided according to the value of S[10] of a detection point of the shift register. A switching indication of each mode may correspond to a different value of S[10]. For example, S[10]=0 means switching to the second mode, and S[10]=1 means switching to the first mode.

Figure 11:
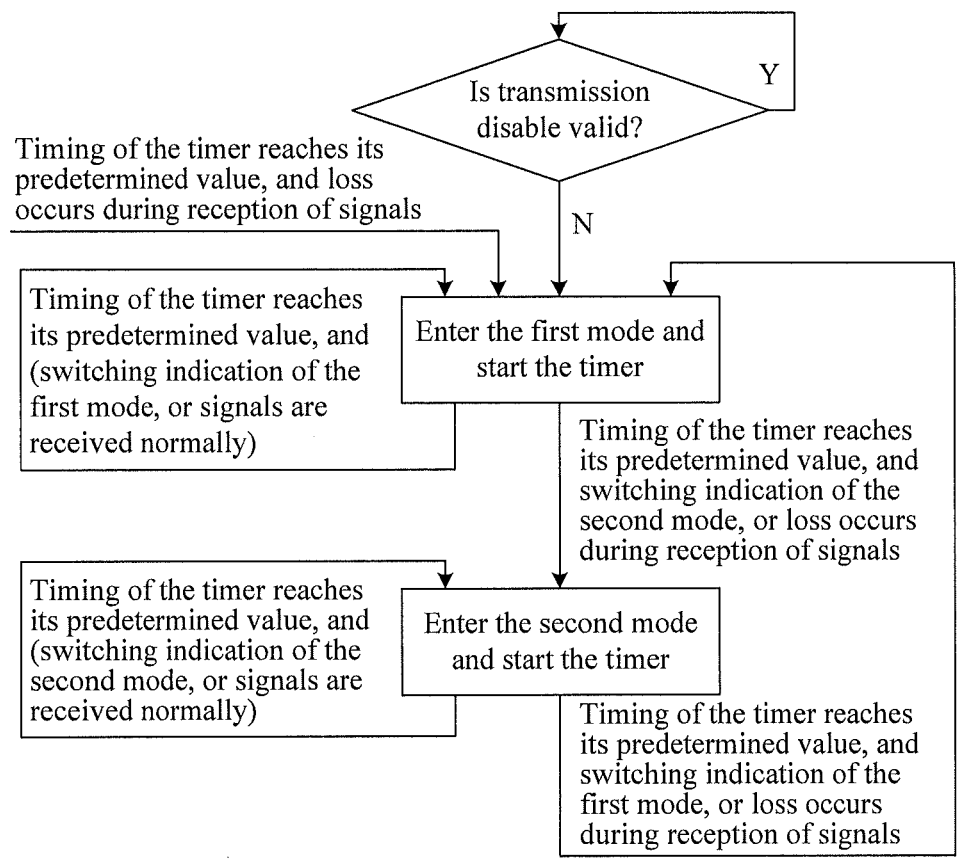
FIG. 11 is a schematic diagram of a state machine in an optical signal transport method based on a single fiber bi-directional optical module according to another embodiment of the present invention.

With reference to Table 1 above, the following describes a specific working principle of a channel self-search state machine. FIG. 11 is a schematic diagram of a state machine in an optical signal transport method based on a single fiber bi-directional optical module according to another embodiment of the present invention. Specifically, the following may be included:

(1) After an optical module is powered on, if externally input transmission disable TX_Disable is valid (for example, TX_Disable=true, which indicates that transmission is disabled), turn off the first electrical/optical converter and the second electrical/optical converter, and return to execute (1). Otherwise, execute (2) to enter a channel self-search state. (1) is an optional step. The channel self-search of the optical module may also be started by default or in other manners, instead of using the TX_Disable to control the starting of the self-search of the optical module.

(2) If the externally input transmission disable TX_Disable of the optical module is invalid (for example, TX_Disable=false, which indicates that transmission is allowed), enter the first mode A_MODE state, select the first channel for transmitting, select the second channel for receiving, and start a Sample_timer timer.

(3) In the A_MODE state, if timing of the Sample_timer timer reaches its predetermined value (for example, Sample_timer_done is valid), and the detection point of the shift register is a switching indication of the first mode, for example, when S[10] (Det_point)=0 or LOS_Det=true is detected, that is, signals are received normally, finish the current channel self-search, maintain the current A_MODE state, and meanwhile restart the Sample_timer timer. Therefore, the channel self-search result is: in the A_MODE state, selecting the first channel for transmitting, and selecting the second channel for receiving. The Sample_timer timer may provide a sampling window long enough to ensure that signals can be correctly detected. The time directly affects the channel search time. It is recommended that the time should be adjusted by actual measurement and verification under a circumstance of a longest transmission distance. It is recommended that the timer period should be about 50 ms. Sample_timer_done is valid when timing of the Sample_timer timer reaches its predetermined value.

(4) In the A_MODE state, if timing of the Sample_timer timer reaches its predetermined value (Sample_timer_done is valid) and the detection point of the shift register is a switching indication of the second mode, for example, when S[10] (Det_point)=1, and LOS_Det=false is detected, that is, loss occurs during reception of signals, switch to the second mode B_MODE state, select the second channel for transmitting, select the first channel for receiving, and restart the Sample_timer timer (that is, Start Sample_timer).

(5) In the B_MODE state, if timing of the Sample_timer timer reaches its predetermined value (for example, Sample_timer_done is valid), and the detection point of the shift register is a switching indication of the second mode, for example, when S[10] (Det_point)=1 or LOS_Det=true is detected, that is, signals are received normally, finish the current channel self-search, maintain the current B_MODE state, and meanwhile restart the Sample_timer timer. Therefore, the channel self-search result is: in the B_MODE state, selecting the second channel for transmitting, and selecting the first channel for receiving.

(6) In the B_MODE state, if timing of the Sample_timer timer reaches its predetermined value (Sample_timer_done is valid) and the detection point of the shift register is a switching indication of the first mode, for example, when S[10] (Det_point)=0, and LOS_Det=false is detected, that is, loss occurs during reception of signals, switch to the A_MODE state again: select the first channel for transmitting, and select the second channel for receiving. Repeat this until signals are received normally. Then the channel self-search is finished.

(7) If timing of an A_time timer reaches its predetermined value (A_Time_done is valid), and LOS_Det=false, that is, loss occurs during reception of signals, enter the A_MODE state: select the first channel for transmitting, select the second channel for receiving, and start the Sample_timer timer. Repeat (3) to (6) until signals are received normally. Then the channel self-search is finished. A_timer is a free-run timer, used as a state machine to return to an initial state. The timer is used to reduce the possibility that channel search enters a deadlock state when two nodes select the same transmitting and receiving channels at the same time. It is recommended that the timer period is about 1.3 s. A_Time_done is valid when timing of the A_timer timer reaches its predetermined value.

Preferably, the enabling and disabling of the channel self-search function added for the single fiber bi-directional optical modules at both ends in the embodiment of the present invention may be controlled externally. The function is enabled by default. The transmitting ends of the first channel and second channel can be turned off and queried separately. A transmission disable control signal TX_Disable sent by an external optical module has the highest priority. Therefore, if an external turn-off control signal indicates that transmitting is enabled, the TX_Disable register may independently control turn-off of the transmitting end. If the external turn-off control signal indicates that transmitting is not enabled, the transmitting ends of two channels are both turned off. In addition, a transmitting channel may be selected. Before output optical interface indicators of different transmitting channels are tested, corresponding transmitting channels may be selected. Before the operation, it is necessary to disable the channel search function. The current selected transmitting and receiving channels may be queried.

The single fiber bi-directional optical module in this embodiment may control selection of optical communication channels. Therefore, structures of single fiber bi-directional optical modules of two communication ends may be the same, and the single fiber bi-directional optical modules do not need to be used in pairs; hence device numbers and maintenance costs are reduced, and reliability of on-site installation is improved.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that they may still make modifications to the technical solutions described in the foregoing embodiments, or make equivalent replacements to some technical features thereof, without departing from the scope of the technical solutions of the embodiments of the present invention.

What is claimed is:

1. A single fiber bi-directional optical module, comprising:
a transmission selection circuit comprising a first selection circuit;
a receiving selection circuit comprising a second selection circuit; and
a self-search circuit respectively connected to the transmission selection circuit and the receiving selection circuit, wherein:
the self-search circuit is configured to search for channels, and instruct through the first selection circuit, according to a channel search result, the transmission selection circuit to transmit optical signals through one of at least two channels for transmitting optical signals, wherein optical wavelengths of the at least two channels for transmitting optical signals are different; and
the self-search circuit is further configured to instruct through the second selection circuit, according to a channel search result, the receiving selection circuit to receive optical signals through one of at least two channels for receiving optical signals;
wherein optical wavelengths of the at least two channels for receiving optical signals correspond to the optical wavelengths of the at least two channels for transmitting optical signals, and
wherein the transmission selection circuit comprises a transmission drive circuit and at least two transmitting units connected to the transmission drive circuit through the first selection circuit.

2. The single fiber bi-directional optical module according to claim 1, wherein:
wavelengths of optical signals transmitted by the at least two transmitting units are different, and
the transmission drive circuit is configured to select and control, according to an instruction of the self-search circuit, one of the at least two transmitting units to transmit optical signals through one of the at least two channels for transmitting optical signals.

3. The single fiber bi-directional optical module according to claim 2, wherein the selecting and controlling one of the at least two transmitting units by the transmission drive circuit, according to the instruction of the self-search circuit, is through the first selection circuit.

4. The single fiber bi-directional optical module according to claim 2, wherein:
the receiving selection circuit comprises a receiving drive circuit and at least two receiving units connected to the receiving drive circuit through the second selection circuit,
wavelengths of optical signals received by the at least two receiving units are different, and
the receiving drive circuit is configured to select and control, according to the instruction of the self-search circuit through the second selection circuit, one of the at least two receiving units to receive optical signals through one of the at least two channels for receiving optical signals.

5. The single fiber bi-directional optical module according to claim 4, wherein the selecting and controlling of the one of the at least two receiving units by the receiving drive circuit, according to the instruction of the self-search circuit, is through the second selection circuit.

6. The single fiber bi-directional optical module according to claim 4, wherein the transmitting units are electrical/optical converters, and the receiving units are optical/electrical converters.

7. The single fiber bi-directional optical module according to claim 1, wherein the self-search circuit is further configured to detect whether any exception occurs when the receiving selection circuit receives optical signals.

8. The single fiber bi-directional optical module according to 7, wherein if an exception occurs when the receiving selection circuit receives optical signals, the self-search circuit is further configured to instruct the transmission selection circuit and the receiving selection circuit to switch a current channel for receiving optical signals and a current channel for transmitting optical signals.

9. A transport system based on a single fiber bi-directional optical module, comprising a first single fiber bi-directional optical module and a second single fiber bi-directional optical module, wherein:
the first single fiber bi-directional optical module is the single fiber bi-directional optical module according to claim 1, and the second single fiber bi-directional optical module is the single fiber bi-directional optical module according to claim 1; and optical signals are transported between the first single fiber bi-directional optical module and the second single fiber bi-directional optical module through a communication fiber, wherein
a transmission selection circuit of the first single fiber bi-directional optical module is configured to transmit optical signals to a receiving selection circuit of the second single fiber bi-directional optical module; and
a receiving selection circuit of the first single fiber bi-directional optical module is configured to receive optical signals transmitted by a transmission selection circuit of the second single fiber bi-directional optical module.

10. An optical signal transport method based on a single fiber bi directional optical module, comprising:
searching, by a self-search circuit of the single fiber bi-directional optical module, for channels; and
according to a channel search result, instructing the single fiber bi-directional optical module through a first selection circuit, to transmit optical signals through one of at least two channels for transmitting optical signals, and instructing the single fiber bi-directional optical module through a second selection circuit to receive optical signals through one of at least two channels for receiving optical signals;
wherein the instructing to transmit the optical signals is sent to a transmission drive circuit to select one of the at least two optical channels through the first selection circuit to transmit the optical signals, and
wherein optical wavelengths of the at least two channels for transmitting optical signals are different, and optical wavelengths of the at least two channels for receiving optical signals correspond to the optical wavelengths of the at least two channels for transmitting optical signals.

11. The method according to claim 10, wherein the searching, by a self-search circuit of the single fiber bi-directional optical module, for channels, specifically comprises:
detecting whether any exception occurs during reception of optical signals; and
if an exception occurs during the reception of optical signals, switching a current channel for receiving optical signals and a current channel for transmitting optical signals.

* * * * *